UNITED STATES PATENT OFFICE.

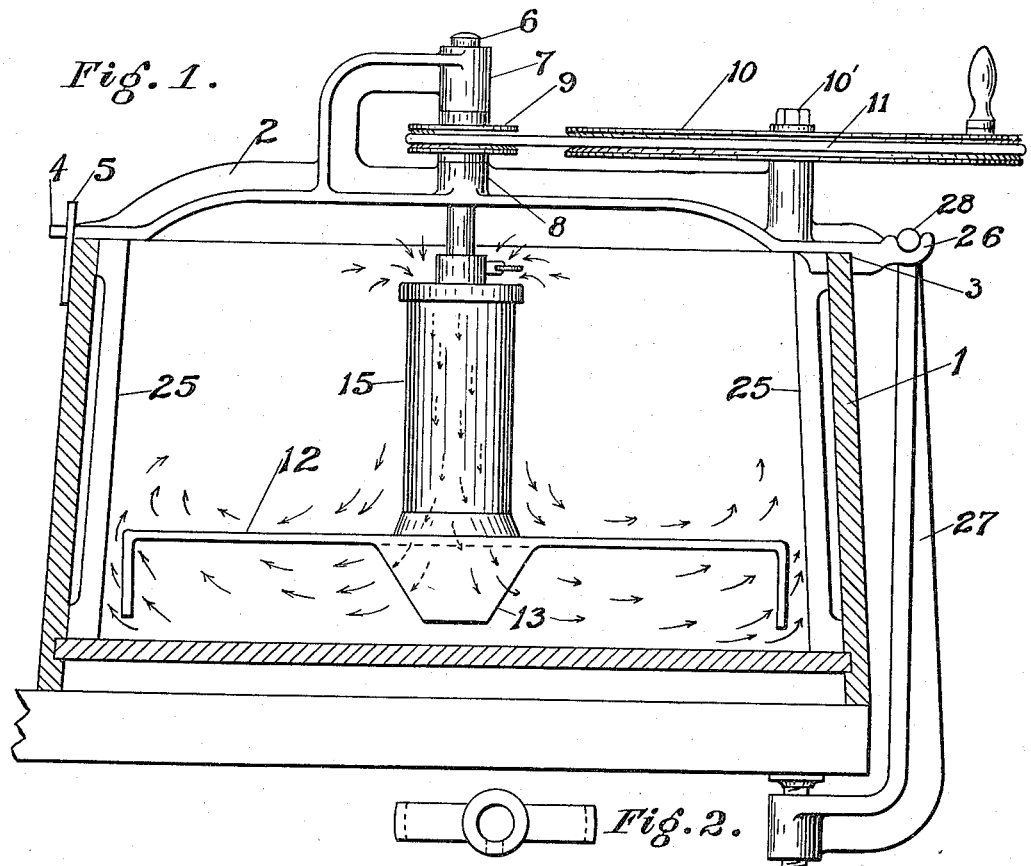

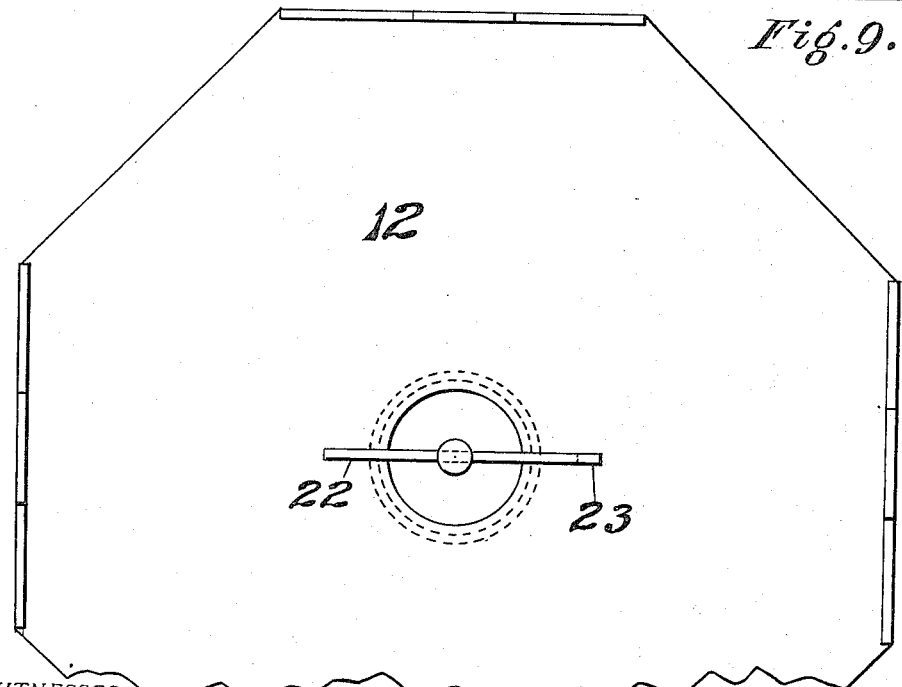

ALPHEUS FAY, OF LOUISVILLE, KENTUCKY.

BUTTER-SEPARATOR.

1,155,306.

Specification of Letters Patent.

Patented Sept. 28, 1915.

Application filed February 11, 1915. Serial No. 7,657.

*To all whom it may concern:*

Be it known that I, ALPHEUS FAY, a citizen of the United States, and a resident of Louisville, in the county of Jefferson and State of Kentucky, have invented a certain new and useful Butter-Separator, of which the following is a specification.

My invention relates to butter separators, and its object is to provide means for operating upon milk or cream in such a manner as to secure the greatest proportion of butter from the milk or cream with the highest degree of purity and to reduce the length of time required for accomplishing this.
A further object is to so construct the apparatus that it is readily put together and taken apart and is easily kept clean and sanitary.

My invention consists in an apparatus and in the combination of parts thereof and the details of construction and arrangement of said parts, as will hereinafter be more fully described and claimed.

In the drawing Figure 1 is a sectional elevation of an apparatus embodying my invention. Fig. 2 is a detail plan view of the hub and its arms for holding down the hollow shaft on the solid shaft. Fig. 3 is a detail side elevation of the same. Fig. 4 is the detail side elevation of part of the vessel, the bracket and the detachable arm. Fig. 5 is a detail sectional view showing how the fly wheel may be adjustably mounted. Fig. 6 is a detail plan view of the upper end of the hollow shaft showing how it is constructed to receive the arms shown in Figs. 2 and 3. Fig. 7 is the detail side elevation of the pin that holds the impeller on the bottom of the solid shaft. Fig. 8 is a sectional detail of the lower end of the solid shaft showing how the pin illustrated in Fig. 7 fits therein. Fig. 9 is the vertical cross section through the impeller and its hollow shaft with the solid shaft, the hub and arms and the holding pin shown in elevation. Fig. 10 is an inverted plan view of the impeller, the lower end of the solid shaft and the holding pin.

As shown in Figs. 1 to 10, inclusive, the vessel 1 has a bracket 2 mounted across at the top, bearing on the rim of the vessel 1, at one side, with a channel 3 fitting over the rim of the vessel and, where it bears on the rim at the other side, having a shank 4 fitting in a clip 5 that is screwed to the vessel arm.

Journaled vertically in this bracket 2 is a solid shaft 6 said bracket 2 having an upper bearing 7 and a lower bearing 8 between which bearings said shaft 6 has fixed upon it a pulley 9 that has a grooved periphery. Also this bracket 2 has a driving wheel 10 mounted on a stud 10' at near one side of the vessel, this driving wheel 10 being in a horizontal plane with pulley 9 and having a grooved periphery, there being a belt 11 passing around the grooved peripheries of the driving wheel 10 and the pulley 9 so that when the driving wheel, which is of much greater diameter than the pulley 9, is turned, it will drive the shaft 6 at a moderately high speed.

The shaft 6 extends down into the vessel to receive and rotate the impeller 12. This impeller consists of a plane polygonal disk, made polygonal from a square disk by turning down the corners 13, being a single member like one of the members of the impeller shown in my patent of March 19, 1912, No. 1020814, in its formation. Centrally this plane impeller has an aperture around which is turned up an annular flange 14 with tapering outer sides down over which fits the hollow or tubular shaft 15 with flaring lower end to fit over the flange 14 snugly and center the impeller with respect to the shaft 6 when the tubular shaft 15 has been connected to this shaft 6. This connection is made by means of a hub 16 with a set screw 17 by means of which it is clamped to the shaft 6 and arms 18 on said hub that extends oppositely and turn downward and engage in notches 19 in the upper arm of the tubular shaft 15 inside the ring or ferrule 20 by which the upper end of the tubular shaft 15 is surrounded and reinforced.

To hold the impeller 12 up on the shaft 6 said shaft 6 is provided near its lower end with a transverse opening 21 through which a pin 22 passes with a recess in the middle of its lower side that allows the pin to drop down with the ends of the recess engaging with the opposite sides of the shaft 6, thus preventing endwise movement of the pin 22 from the shaft. At one end this pin has an upward projection 23 and the plane impeller 12 has, a short distance out from its flange 14 and the tubular shaft 15, an opening 24 up through which this projection 23 of the pin 22 extends. By this means the impeller bearing down on the pin 22 will hold it down in the opening 21 in the shaft and will also hold its projection 23 up through the impeller so that the pin will be retained by the engagement of the impeller and the impeller as well as the tubular shaft will be held concentric with the shaft 6 as well as compelled to rotate with the shaft through the action of this pin 22 in conjunction with that of the hub 16 and its arms engaging with the upper part of the tubular shaft 15.

When the impeller 12 is rotated its upper and lower plane surfaces will act centrifugally upon the milk or cream in the vessel and in contact with said surfaces, throwing the liquid upward as indicated by the arrows in Fig. 1, thus creating an area of reduced pressure near the center of the impeller, with the result that air will pass down through the hollow shaft 15 into this area below the impeller and also drawing air down outside the hollow shaft 15 above the impeller as indicated by the arrows near the center in Fig. 1. This smooth centrifugal action without impact throws the liquid outward toward the walls of the vessel 1. A simple whirling of the liquid is prevented by suitable brakes 25 held up against the walls of the vessel close to the circle of rotation of the impeller by having their upper ends fixed in the bracket 2 and their lower ends engaging tightly against the bottom of the vessel. The liquid thus thrown out against the vessel walls and prevented from rotating, will flow upward and inward in a smooth roll without violent disruptive action, and with the air that was drawn down in the center distributed through it, so that it is in a rarified condition, the entire action being a true ebullition comparable to boiling by heating a liquid. Thus the very valuable effect of boiling to produce crystallization or separation of the solid constituents of a liquid is obtained without the application of heat which would be ruinous to milk or cream or other milk elements.

In conjunction with the centrifugal action and aeration produced as above described the impeller 12 also provides vibration of the milk or cream particles by the action of the turned down parts 13 which present closed sides alternately with open spaces around the periphery of the impeller 12 with these closed sides at a slight angle to their circle of rotation; so that the milk or cream particles in the vicinity are vibrated substantially radially inward and outward by the rapid recurrence of these angular sides as the impeller rotates. These vibrations are without material impact and are in conformity with the requirements for the smooth steady action to produce true ebullition as above described, so that the active forces in securing the separation of the butter from the other milk elements are distributed uniformly throughout the body of milk or cream.

The vessel 1 is made broad and of comparatively slight depth, and the impeller is made of diameter great in proportion to its depth or thickness and placed near the bottom of the vessel; the best position for the impeller being at about half the depth of the liquid in the vessel, which, for the best results, is not filled more than one-half full. The space below the impeller, next to the bottom of the vessel, is the space in which most of the reduction of pressure will be produced, and will be kept practically clear of the accumulating butter particles by the constant upward flow of liquid and air under the centrifugal action. In this apparatus the bottom with the single plane plate of the agitator form the space out through which the liquid flows under the centrifugal action and through which the air is carried as it passes down from the hollow shaft 15, being in this respect much simpler than the arrangement with two impeller members as shown in my prior patent above alluded to.

The fork 2 has a brake 26 extending out from the end that has a channeled formation over the rim of the vessel 1 and an arm 27 has lateral projections 28 engaging over the two members, this arm lying between the members, thus forming a detachable connection with the bracket. The lower end of the arm extends inward under the vessel and under a table or other object on which the apparatus is to be supported and has a clamping screw 28' by means of which the bracket may be held down on the vessel and the entire apparatus held down on the supporting object by tightening this screw on the lower side of the supporting object.

The above clamping means is shown, described and claimed in my co-pending application, Serial No. 11,353, filed March 1, 1915.

The driving wheel 10 may be made adjustable toward or away from the pulley 9 to tighten the belt 11 by mounting the wheel on a collar 29 which is clamped against the bracket 2' by means of a bolt 30 passing through the collar and the slot 31 in the bracket, as shown in Fig. 5.

The impeller itself having a very solid and open construction and the tubular shaft and the other parts that connect the impeller and tubular shaft to the solid shaft being readily separable, there is no part of the device that is not easily reached for cleaning. At the same time, notwithstanding the simplicity and economical construction, the device is very effective in its operation to produce the effects in the treatment of milk elements as hereinbefore described.

Having fully described my invention, what I claim as new and desire to secure by Letters Patent is:

1. In a butter separator in combination with a vessel to hold the milk elements, an impeller formed of a single flat substantially rectangular sheet with its corners turned down, whereby the impeller is octagonal with four closed sides alternating with four open sides and defining a space between the lower side of the disk and the bottom of the vessel, with the lower edges of said sides close to the bottom of the vessel, and means for rotating said disk on an axis substantially at right angles to its plane while submerged in the milk elements in the vessel.

2. In a butter separator in combination with a vessel adapted to hold milk elements, an impeller, a supporting and driving shaft for the impeller, a means for mounting said impeller on said shaft consisting of a transverse pin, the shaft having an opening through which the pin extends below the impeller and said impeller having an opening, and a projection on said pin extending up through said opening, the pin having a recess where it passes through the shaft, and the ends of the recess engaging with the sides of the shaft adjacent to the opening therein, whereby the impeller holds the pin down so that its recess prevents the pin from leaving the shaft, and whereby said pin by engaging in the opening in the impeller holds the impeller and shaft concentric.

3. In a butter separator in combination with a vessel to hold the milk elements, an impeller comprising a single disk with a central aperture and a tubular shaft extending down and connecting with this aperture, a solid shaft extending down through the tubular shaft and through the aperture, and means on the lower end of the solid shaft extending across the aperture and securing the said impeller to said shaft.

4. In a butter separator in combination with a vessel to hold milk elements, an impeller formed from a single substantially rectangular sheet with its corners turned down whereby it is octagonal with alternating closed and open sides around its periphery, means for admitting air from above to below said disk, a supporting and driving shaft for the impeller and means for securing said disk to said shaft.

5. In a butter separator in combination with a vessel to hold milk elements, an impeller comprising a single disk having a substantially central aperture up around which extends a flange, a tubular shaft with its lower end fitting down over said flange, a supporting and driving shaft extending down through the tubular shaft, clamping means on the supporting shaft above the upper end of the tubular shaft and having means engaging with the arm of the tubular shaft, said arm having means to engage with the engaging means on the hub whereby the tubular shaft turns with the supporting shaft, the lower part of said supporting shaft having an opening through it, a pin extending transversely through this opening across the aperture in the flat disk, an upward projection on said pin near one end, said disk having an opening in it through which said projection extends, said pin having a recess where it extends through the shaft, the ends of which recess engaging with the sides of the shaft and preventing the pin from becoming displaced endwise from the shaft when held down by said impeller and the tubular shaft and said collar and its engaging means engaging with the upper end of the tubular shaft, whereby all of said parts are readily separable for the purposes set forth.

6. In a butter separator in combination with a vessel to hold milk elements, an impeller comprising a single disk, with means to admit air from above it to below it, a supporting and driving shaft for the impeller, a hollow shaft around the supporting and driving shaft bearing downward upon but detachable from said disk, means on said supporting shaft to hold the hollow shaft down upon said disk, and means on said supporting shaft to hold said disk up on said supporting shaft, all of said holding means being readily detachable, so that the disk, the hollow shaft and the supporting shaft are readily separable for the purposes set forth.

ALPHEUS FAY.

Witnesses:
 HATTIE M. FAY,
 WILLIAM T. BURCH.

Copies of this patent may be obtained for five cents each, by addressing the "Commissioner of Patents, Washington, D. C."